(12) United States Patent
Kumar et al.

(10) Patent No.: US 8,077,726 B1
(45) Date of Patent: Dec. 13, 2011

(54) FAST REROUTE FOR MULTIPLE LABEL SWITCHED PATHS SHARING A SINGLE INTERFACE

(75) Inventors: Nitin Kumar, Fremont, CA (US); Alex Baban, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 259 days.

(21) Appl. No.: 12/391,859

(22) Filed: Feb. 24, 2009

Related U.S. Application Data (60) Provisional application No. 61/121,402, filed on Dec. 10, 2008.

(51) Int. Cl.
*H04L 12/56* (2006.01)
(52) U.S. Cl. .................................. 370/395.31; 370/401
(58) Field of Classification Search .................. None
See application file for complete search history.

(56) References Cited

U.S. PATENT DOCUMENTS

| | | | | |
|---|---|---|---|---|
| 6,847,645 | B1 * | 1/2005 | Potter et al. ................. | 370/392 |
| 6,976,154 | B1 * | 12/2005 | Dyckerhoff et al. .......... | 712/220 |
| 2003/0099218 | A1 * | 5/2003 | Tillotson ...................... | 370/337 |
| 2006/0126496 | A1 * | 6/2006 | Filsfils et al. ................ | 370/216 |

OTHER PUBLICATIONS

U.S. Appl. No. 11/056,383, filed Feb. 10, 2005 entitled, "Fast Reroute of Traffic Associated With a Point to Multi-Point Network Tunnel," Aggarwal.
P. Pan et al., "Fast Reroute Extensions to RSVP-TE for LSP Tunnels," Network Working Group, RFC 4090, May 2005, 36 pgs.

* cited by examiner

*Primary Examiner* — Chirag Shah
*Assistant Examiner* — Salvador E Rivas
(74) *Attorney, Agent, or Firm* — Shumaker & Sieffert, P.A.

(57) ABSTRACT

Techniques are described for maintaining a forwarding information base (FIB) within a packet-forwarding engine (PFE) of a router, and programming a packet-forwarding integrated circuit (IC) with a hardware version of the FIB. Entries of the hardware version identify primary forwarding next hops and backup forwarding next hops for the LSPs, wherein the packet-forwarding IC includes a control logic module and internal selector block configured to produce a value indicating a state of the first physical link. The selector block outputs one of the primary forwarding next hop and the backup forwarding next hop of the entries for forwarding the MPLS packets based on the value in response to the packet-processing engine addressing one of the entries of the FIB for the LSPs. Packets are forwarded with the PFE to the one of the primary forwarding next hop and the backup forwarding next hop output by the selector block.

18 Claims, 5 Drawing Sheets

FAST REROUTE FOR MULTIPLE LABEL SWITCHED PATHS SHARING A SINGLE INTERFACE

This application claims the benefit of U.S. Provisional Application No. 61/121,402, filed Dec. 10, 2008, the entire content of which is incorporated herein by reference.

TECHNICAL FIELD

The invention relates to packet-based computer networks and, more particularly, to forwarding packets within computer networks.

BACKGROUND

Routing devices within a network, often referred to as routers, maintain routing information that describe available routes through the network. Upon receiving an incoming packet, the routers examine information within the packet and forward the packet in accordance with the routing information. In order to maintain an accurate representation of the network, routers exchange routing information in accordance with one or more defined routing protocols, such as the Border Gateway Protocol (BGP).

The term "link" is often used to refer to the connection between two devices on a network. The link may be a physical medium, such as a copper wire, a coaxial cable, any of a host of different fiber optic lines or a wireless connection. In addition, network devices may define "virtual" or "logical" links, and map the virtual links to the physical links. As networks grow in size and complexity, the traffic on any given link, including peering links, may approach a maximum bandwidth capacity for the link, thereby leading to congestion and loss.

Multi-protocol Label Switching (MPLS) is a mechanism used to engineer traffic patterns within Internet Protocol (IP) networks. By utilizing MPLS, a source device can request a path through a network, i.e., a Label Switched Path (LSP). An LSP defines a distinct path through the network to carry MPLS packets from the source device to a destination device. A short label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS).

A variety of protocols exist for establishing LSPs. For example, one such protocol is the label distribution protocol (LDP). Another type of protocol is a resource reservation protocol, such as the Resource Reservation Protocol with Traffic Engineering extensions (RSVP-TE). RSVP-TE uses constraint information, such as bandwidth availability, to compute and establish LSPs within a network. RSVP-TE may use bandwidth availability information accumulated by a link-state interior routing protocol, such as the Intermediate System-Intermediate System (ISIS) protocol or the Open Shortest Path First (OSPF) protocol.

SUMMARY

In general, techniques are described for reducing a delay experienced when a link fails before network traffic associated with label switched paths (LSPs) associated with the failed link is rerouted through a detour tunnel associated with the LSP. That is, the techniques described herein enable a router along the LSPs to efficiently update forwarding information base (FIB) entries to effectively reroute the traffic associated with the LSPs. In particular, application of the techniques allows the time needed by the router to update the FIB entries to effectively be independent of the number of LSPs running over the failed link. In other words, regardless of the number of LSPs associated with the failed link, the time for the router to update the corresponding FIB entries is effectively constant without dependency on the volume of traffic or number of LSPs.

As described herein, the router programs a hardware-based copy of the FIB into an application-specific integrated circuit (ASIC) of a packet-forwarding engine of the router. Each entry of the hardware FIB internally points to a primary next hop and a backup next hop associated with the LSP for that entry, where the backup next hop is used for rerouting traffic on the LSP through a detour tunnel for that LSP. In addition, each entry of the hardware FIB is associated with a corresponding selector block within the ASIC, where the selector block is electrically controlled based on a status of the link associated with the primary next hop, which reflects the status of the link associated with the primary next hop. For example, the selector block may be written by a selection software module executing on a microprocessor within a packet-forwarding engine (PFE) of the router that detects the state of the link and writes a corresponding value to the selector block. The selector block provides an output value that indicates to control logic on a line card which physical interface port to use when forwarding packets associated with the respective LSP, i.e., either an interface port associated with a primary next hop or an interface port associated with a backup next hop. Entries within the hardware FIB that correspond to the LSPs associated with the same physical communication link are programmatically mapped within the ASIC to the internal selector block. Upon detecting a link failure, the control logic of the forwarding engine reprograms the selector block of the ASIC to reflect the status change, i.e., that the corresponding physical link has failed, thereby automatically causing the output value of the selector block to change so that the forwarding ASICs automatically use the backup next hops for all LSPs associated with the failed link.

The techniques described herein may provide one or more advantages. For example, the techniques described herein may allow for better scalability and decreased packet loss compared to other approaches. For example, for an approach that requires control plane signaling to rewrite the entries within a packet-forwarding engine hardware FIB to switch to the bypass tunnel, the number of operations required to effect the switch of all LSPs sharing the failed link to their backup next hops would be proportional to the number N of LSPs sharing the failed link. The complexity would therefore be O(N) in such a design. As a result, the packet loss seen during link failure may exceed acceptable amounts, particularly in situations having a large number of LSPs sharing the failed link. In contrast, the techniques described herein avoid these problems.

For example, as described herein, the techniques allow the control plane to program a hardware FIB into packet-forwarding engine ASICs of the router in a format and structure that includes both the primary forwarding next hop and the backup forwarding next hop, as well as associate each of the forwarding entries to a selector block within the ASIC that is associated with the physical communication link to the primary next hop, where the selector block reflects the state of that physical link. Depending on the value of the selector block, control logic within the ASIC selects either the primary forwarding next hop or the backup forwarding next hop of each entry in the hardware FIB for purposes of forwarding packets associated with the FIB entries. Upon failure of a link, the amount of time necessary to divert the traffic from the primary forwarding next hops to the backup forwarding next hops, and therefore, the amount of dropped traffic, is independent of the number of LSPs running over the failed link and instead a constant time is required to update the electrical state of the selector block within the forwarding ASIC. The techniques described herein allow for complexity of O(1) rather than O(N), where N is the number of LSPs currently assigned to the failed link. This avoids the need for control plane signaling to entirely rewrite or otherwise reprogram FIB entries within the ASIC in order to switch to a detour tunnel, and may allow for improved service and scalability when a large number of LSPs are running over a single link.

In one embodiment, a router includes a routing protocol configured to maintain routing information in accordance with a topology of a network, a first interface port configured to engage a first physical link, a packet-forwarding engine (PFE), a packet-forwarding engine (PFE) configured to output multi-protocol Label Switching (MPLS) packets associated with a plurality of label switched paths (LSPs) onto the first physical link using the first interface port, a packet-forwarding integrated circuit (IC) of the PFE comprising a control logic module and internal selector block configured to produce a value indicating a state of the first physical link. The packet-forwarding IC is programmed to internally store a hardware version of a forwarding information base (FIB) in accordance with the routing information, the hardware version of the FIB including a plurality of entries addressable by the packet-forwarding IC, the entries identifying pairs of primary forwarding next hops and backup forwarding next hops for the LSPs. The selector block of the packet-forwarding IC is configured to output one of the primary forwarding next hop and the backup forwarding next hop of the entries for forwarding the MPLS packets based on the value indicating the state of the first physical link in response to the packet-processing engine addressing one of the entries of the FIB for the LSPs. The PFE forwards the MPLS packets to the one of the primary forwarding next hop and the backup forwarding next hop output by the selector block.

In another embodiment, a method includes maintaining routing information in accordance with a topology of a network with a routing protocol of a router, and, with a packet-forwarding engine (PFE) of the router, outputting multi-protocol Label Switching (MPLS) packets associated with a plurality of label switched paths (LSPs) onto a first physical link using a first interface port, wherein the first interface port is configured to engage the first physical link. The method further includes programming a packet-forwarding integrated circuit (IC) of the PFE to internally store a hardware version of a forwarding information base (FIB) in accordance with the routing information, the hardware version of the FIB including a plurality of entries addressable by the packet-forwarding IC, the entries identifying pairs of primary forwarding next hops and backup forwarding next hops for the LSPs, wherein the packet-forwarding IC comprises a control logic module and internal selector block configured to produce a value indicating a state of the first physical link. The selector block of the packet-forwarding IC is configured to output one of the primary forwarding next hop and the backup forwarding next hop of the entries for forwarding the MPLS packets based on the value indicating the state of the first physical link in response to the packet-processing engine addressing one of the entries of the FIB for the LSPs. The method also includes forwarding packets with the PFE to the one of the primary forwarding next hop and the backup forwarding next hop that is output by the selector block.

In another embodiment, a computer-readable medium comprises instructions for causing a programmable processor to, with a packet-forwarding engine (PFE) of the router, output multi-protocol Label Switching (MPLS) packets associated with a plurality of label switched paths (LSPs) onto a first physical link using a first interface port, wherein the first interface port is configured to engage the first physical link. The instructions cause the programmable processor to program a packet-forwarding integrated circuit (IC) of the PFE to internally store a hardware version of a forwarding information base (FIB) in accordance with routing information maintained in accordance with a topology of a network, the hardware version of the FIB including a plurality of entries addressable by the packet-forwarding IC, the entries identifying pairs of primary forwarding next hops and backup forwarding next hops for the LSPs, wherein the packet-forwarding IC comprises a control logic module and internal selector block configured to produce a value indicating a state of the first physical link. The selector block of the packet-forwarding IC is configured to output one of the primary forwarding next hop and the backup forwarding next hop of the entries for forwarding the MPLS packets based on the value indicating the state of the first physical link in response to the packet-processing engine addressing one of the entries of the FIB for the LSPs. The instructions cause the programmable processor to forward packets with the PFE to the one of the primary forwarding next hop and the backup forwarding next hop that is output by the selector block.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
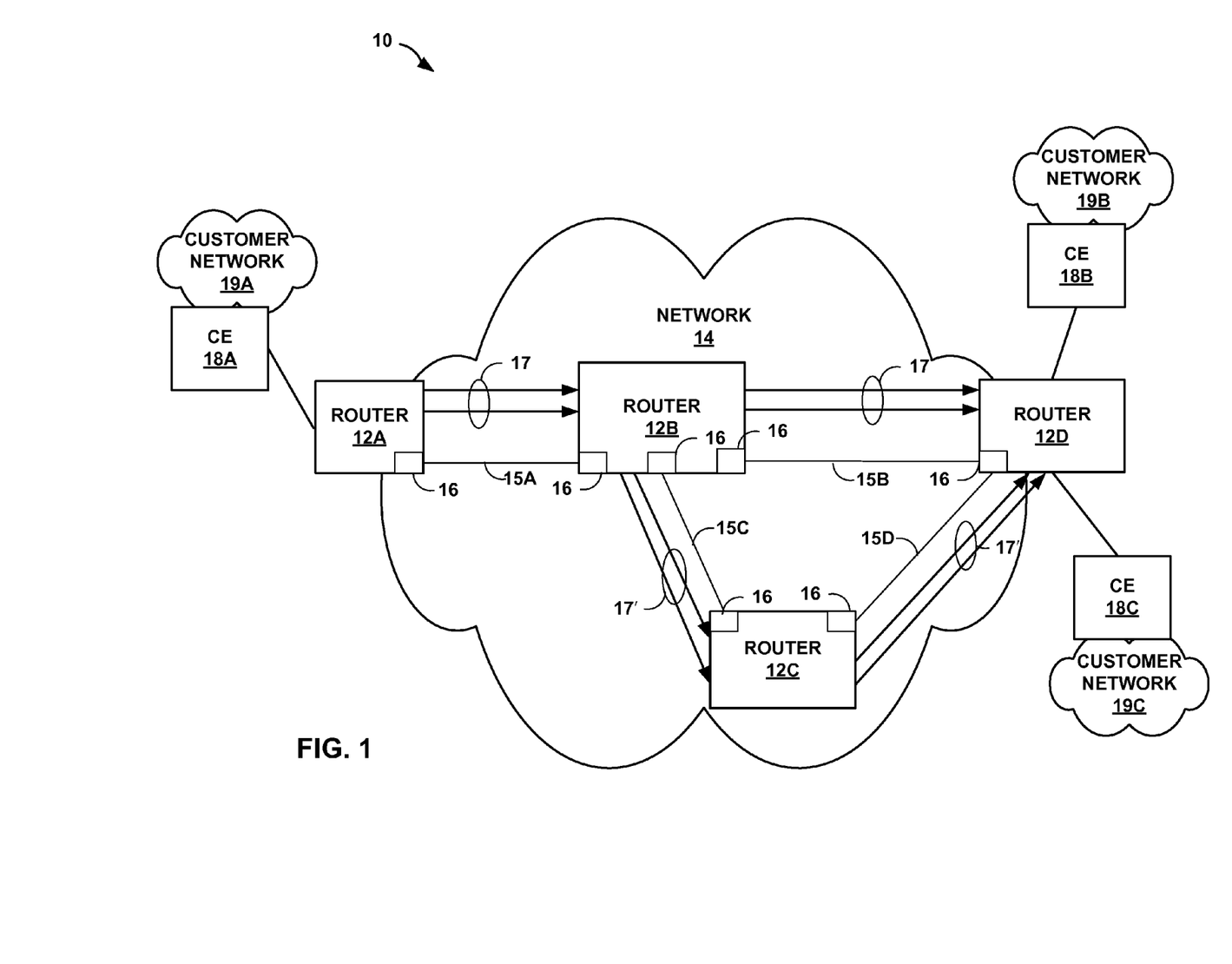
FIG. 1 is a block diagram illustrating an example system in which routers are configured to forward network traffic in accordance with the principles of the invention.

FIG. 1 is a block diagram illustrating an example system 10 in which routers 12A-12D ("routers 12") of network 14 are configured to forward network traffic (e.g., network packets) in accordance with the principles of the invention. In the illustrated example of FIG. 1, routers 12A and 12D are edge routers of a network 14, which may be administered by a network service provider, and provide connectivity for customer networks 19A-19C ("customer networks 19"). In particular, edge routers 12A and 12D are coupled to customer edge (CE) routers 18A-18C ("CE routers 18") of customer networks 19 via access links 16A 16C, respectively. Edge routers 12A and 12D communicate with CE routers 18 to provide customer networks 19 with access to network 14.

As shown, each of customer networks 19 may be a network for a site of an enterprise. Each of customer networks 19 may include one or more computing devices (not shown), such as personal computers, laptop computers, handheld computers, workstations, servers, switches, printers, or other devices. Network 14 may be a service provider network coupled to one or more networks administered by other service providers, and may thus form part of a large-scale public network infrastructure, e.g., the Internet. Consequently, customer networks 19 may be viewed as edge networks of the Internet. The service provider may provide computing devices within customer networks 19 with access to the Internet via network 14, which allows computing devices within one of customer networks 19 to communicate with computing devices within the Internet or the other one of customer networks 19. FIG. 1 may be a simplified view of network 14. Network 14 may include a variety of other network devices (not shown), such as routers, switches, servers, and the like and may be connected to other networks.

In this example, routers 12A-12D are connected to one another by physical links 15A-15D (collectively, "physical links 15") coupled to routers 12A-12D by interface ports 16. For example, physical link 15A couples router 12A to 12B. The physical links 15 may be a physical medium, such as a copper wire, a coaxial cable, any of a host of different fiber optic lines, or a wireless connection. Network 14 may be traffic-engineered to include multiple label switched paths (LSPs) 17 for controlling the flow of traffic through network 14. For example, a plurality of LSPs 17 may be established within network 14 using the Resource Reservation Protocol with Traffic Engineering extensions (RSVP-TE), and each LSP represents an RSVP-TE tunnel carrying traffic from CE 18A or other sources (not shown) such as other customer networks. For example, LSPs 17 may be used to carry L2 communications from customer network 19A to customer networks 19B, 19C in the form of MPLS encapsulated packets that enter the LSPs as ingress router 12A and exit the LSPs at egress router 12D.

In the example of FIG. 1, LSP 17 extends from router 12A (an ingress) to router 12B to router 12D (an egress). Further, backup LSP tunnels 17' extend from router 12B to router 12C to router 12D, thereby providing alternative tunnels for traffic flow. In some cases, a backup LSP tunnel 17' may merge back into the protected LSP. Although the LSPs 17 are illustrated in FIG. 1 as delivering the traffic from the direction of router 12A to router 12D, additional LSPs not shown may be established within network 14 for delivering the traffic in the opposite direction. Moreover, multiple LSPs 17 may be established over a single physical link 15, which may be useful for carrying traffic originating from different sources or traffic of different type or quality of service.

If physical link 15B should fail, then all of the LSPs 17 running over the failed link 15B should be switched as soon as possible to a corresponding backup LSP tunnels 17' associated with a different link 15C to minimize traffic loss. In this example, router 12B is configured in advance with primary and backup next hops for protected LSPs having backup bypass tunnels, where the primary next hop is associated with a physical link 15B different from the physical link 15C for reaching backup next hop router 12C. In this way, traffic associated with the protected LSPs 17 can be quickly rerouted to the backup next hop router 12C via backup LSP tunnels 17' in the event of a failure of link 15B associated with the primary next hop router 12D. For example, router 12B may be configured such that a primary next hop of an LSP is associated with one of interface ports 16 of router 12B (e.g., associated with link 15B extending between router 12B and router 12D), while the backup next hop of that LSP is associated with a different one of interface ports 16 of router 12B (e.g., associated with link 15C extending between router 12B and router 12C). In some aspects, some of LSPs 17 may be established as point-to-multipoint (P2MP) LSPs, as described in application Ser. No. 11/056,383, filed on Feb. 10, 2005, entitled FAST REROUTE OF TRAFFIC ASSOCIATED WITH A POINT TO MULTI-POINT NETWORK TUNNEL, the entire contents of which is incorporated herein by reference.

In order to maintain an accurate representation of the network 14, routers 12 exchange routing information using control-plane signaling in accordance with one or more defined protocols, such as the Border Gateway Protocol (BGP). When routers of different autonomous systems use BGP to exchange information, the protocol is referred to as External BGP (EBGP). When routers within an autonomous system use BGP to exchange routing information, the protocol is referred to as Internal BGP (IBGP). Another example protocol for exchanging routing information is the Intermediate System to Intermediate System protocol (ISIS), which is an interior gateway routing protocol for IP networks for communicating link-state information within an autonomous system. Other examples of interior routing protocols include the Open Shortest Path First (OSPF), and the Routing Information Protocol (RIP).

When two of routers 12 initially connect, they typically exchange all of their routing information. The routers 12 send control messages to incrementally update the routing information when the network topology changes. For example, the routers 12 may send update routing protocol messages to advertise newly available routes and to withdraw routes that are no longer available.

Routers 12 may maintain the routing information in the form of one or more routing tables or other data structures. The form and contents of the routing tables depends on the routing algorithm implemented by the routers 12. Furthermore, as described in further detail below, routers 12 generate and maintain forwarding information in accordance with the routing information. The forwarding information associates network routes with specific forwarding next hops and corresponding interface ports of the router 12. The forwarding information may, therefore, be thought of as a subset of the information contained within routing information. The process of generating the forwarding information is generally referred to as route resolution.

In accordance with the techniques described herein, router 12B may store forwarding information in which entries for protected LSPs are each represented as primary/backup next hop pairs. Specifically, router 12B may include one or more packet-forwarding engines having packet-forwarding ICs for high-speed switching and forwarding of network packets based on keying information extracted from headers of the packets, e.g., an MPLS label stack, destination addresses, or other information. A control-plane of router 12B maintains routing information to reflect the topology of network 14 processes the routing information to select routes to the various destinations and generate a forwarding information base (FIB), such as a database or series of tables or other data structures, that map packet keying information to next hops and corresponding output interfaces of the router. The control plane of router 12B configures the forwarding ASIC of its packet-forwarding engine by programming the ASICs with a hardware-based copy of the FIB.

Further, entries of the FIB include the primary and backup next hop pairs for the protected LSPs 17 for which router 12B operates as a label-switched router (LSR). For example, each entry of the FIB as generated as well as the hardware-based copy within the ASICs may be configured to include a pointer to a data structure defining the primary/backup pair of next hops, where the data structure specifies (1) an interface port for the primary next hop and a corresponding MPLS label to be applied to a packet that is sent to the primary next hop, and (2) an interface port for the backup next hop and a corresponding MPLS label to be applied to a packet that is sent to the backup next hop.

In addition, each entry in the hardware-based copy of the FIB within the ASICs is logically associated with a selector block (e.g., a software module executing on a microprocessor in the PFE or selection circuitry within the ASIC) configured to output a selection signal based on the state of the link and/or interface port of router 12B to which the primary next hop for the entry is assigned. The selector block may, for example, include selection circuitry electrically coupled to a memory space, e.g., a single bit, where a value of "0" corresponds to the link being active and a value of "1" corresponds to the link being down. The selector block may be written by a selection software module executing on a microprocessor within the PFE that detects the state of the link and writes a corresponding value to the selector block. When the value produced by the output signal of the selector block is "0" (i.e., a logical false), control circuitry within the forwarding ASIC automatically selects the primary next hop for the FIB entry such that the primary next hop is used as the next hop for forwarding packets having keying information that matches the entry within the FIB, i.e., packets traversing the LSP with which the FIB entry is associated. When the value output by the selector block is "1" (i.e., a logical true), the control circuitry within the ASIC automatically selects the backup next hop for the FIB entry for use as the next hop for the packets received at router 12B on the protected LSP. The logical values are provided for exemplary purposes, and operation of the selection block may be modified without deviating from the principles of the invention.

Where several protected LSPs 17 are running over a single physical link 15, the control plane of router 12B programs the ASIC to internally map the different addressable hardware FIB entries associated with the different LSPs 17 to a single selector block (i.e., the same selector block circuitry) that is associated with that particular physical link 15. If the link 15 should fail, control circuitry within router 12B need only rewrite the value in the programmable memory of that particular selector block within the ASIC to reflect the link failure so as to cause traffic on each of the LSPs 17 to automatically be output on the physical interface associated with the corresponding backup next hop without having to individually rewrite each next hop in the hardware FIB or otherwise reprogram or reconfigure the hardware FIB. Therefore, upon failure of a link 15, the amount of time necessary to divert the traffic from the primary next hops to the backup next hops can be significantly reduced and, moreover, is independent of the number of LSPs running over the failed link that need to be redirected. This may allow for improved service and scalability when a large number of LSPs are running over a single physical output port and physical communication link.

The configuration of the network environment illustrated in FIG. 1 is merely exemplary. For example, service provider network 14 may include any number of provider edge routers coupled to one or more customer networks. Nonetheless, for ease of description, only customer networks 19A-19C are illustrated in FIG. 1. As another example, router 12B may be associated with a greater number of LSPs than shown in FIG. 1.

The techniques described herein apply to a physical, hardware failure of a link 15 or the interface ports connecting the link to a network device. In addition, the techniques described herein also apply in situations where an interface logically fails, although there may be no physical failure. For example, an operations and management (OAM) protocol running over an Ethernet link may be able to detect that an interface has logically gone down. A notification of a logical link failure may also trigger the traffic of all LSPs on the failed link to be rerouted to bypass tunnels, in accordance with the techniques described herein.

Figure 2:
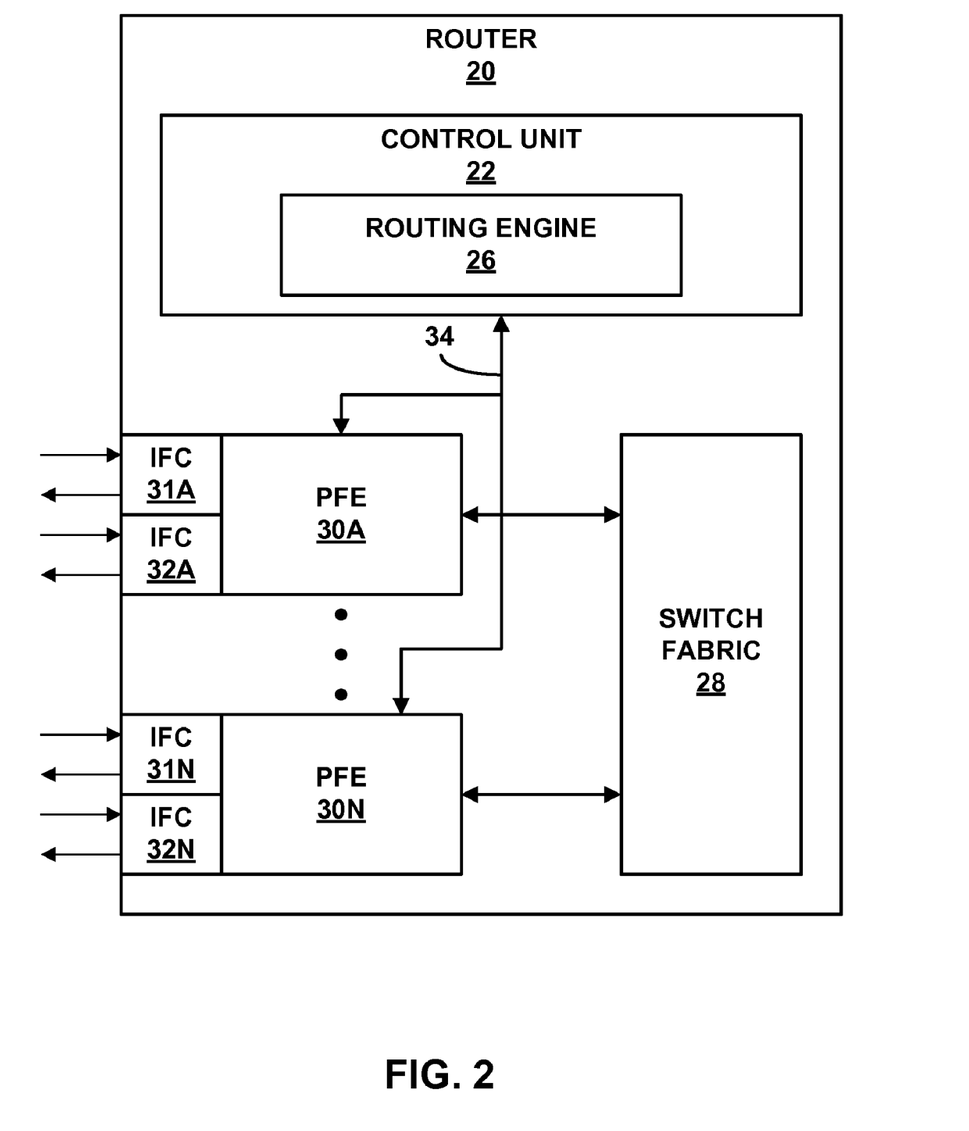
FIG. 2 is a block diagram illustrating an example embodiment of a router consistent with the principles of the invention.

FIG. 2 is a block diagram illustrating an example router 20 that creates forwarding structures to be installed in a forwarding plane in accordance with the principles described herein. Router 20 may comprise a router such as one of routers 12 or CE routers 18 of FIG. 1, a core router, or other network device. In this example, router 20 includes a control unit 22 that includes a routing engine 26 that provides control plane functionality for router 20. Router 20 also includes a plurality of packet-forwarding engines 30A-30N ("PFEs 30") and a switch fabric 28 that collectively provide a data plane for forwarding network traffic. PFEs 30 receive and send data packets via interface cards 31A-31N ("IFCs 31") and IFCs 32A-32N ("IFCs 32"). In other embodiments, each of PFEs 30 may comprise more or fewer IFCs. Although not shown, PFEs 30 may each comprise a central processing unit (CPU) and a memory. Switch fabric 28 provides a high-speed interconnect for forwarding incoming data packets to the correct one of PFEs 30 for transmission over a network. U.S. Patent Application 2008/0044181, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Patent Application 2008/0044181 are incorporated herein by reference.

Routing engine 26 provides control plane functions for storing network topology in the form of routing tables or other structures, executing routing protocols to communicate with peer routing devices and maintain and update the routing tables, and providing a management interface to allow user access and configuration of router 20. Control unit 22 provides an operating environment for routing engine 26 and may be implemented solely in software, or hardware, or may be implemented as a combination of software, hardware or firmware. For example, control unit 22 may include one or more processors which execute software instructions. In that case, routing engine 26 may include various software modules or daemons (e.g., one or more routing protocol processes, user interfaces and the like), and control unit 22 may include a computer-readable storage medium, such as computer memory or hard disk, for storing executable instructions.

Routing engine 26 is connected to each of PFEs 30 by a dedicated internal communication link 34. For example, dedicated link 34 may comprise a 200 Mbps Ethernet connection. Routing engine 26 maintains routing information that describes a topology of a network, and derives a forwarding information base (FIB) in accordance with the routing information. In general, the routing information represents the overall topology of the network. Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS-IS or OSPF). In contrast, the FIB is generated based on selection of certain routes within the network and maps packet key information (e.g., destination information and other select information from a packet header) to one or more specific next hops and ultimately to one or more specific output interface ports of IFCs 31, 32. Routing engine 26 may generate the FIB in the form of a radix tree having leaf nodes that represent destinations within the network. U.S. Pat. No. 7,184,437 provides details on an exemplary embodiment of a router that utilizes a radix tree for route resolution, the contents of which is incorporated herein by reference in its entirety.

Routing engine 26 communicates data representative of a software copy of the FIB into each of PFEs 30 to control forwarding of traffic within the data plane. This allows the software FIB stored in memory (e.g., RAM) of in each of PFEs 30 to be updated without degrading packet-forwarding performance of router 20. In some instances, routing engine 26 may derive separate and different software FIBs for each respective PFEs 30. In addition, one or more of PFEs 30 include application-specific integrated circuits (ASICs) (not shown) that PFES 30 programs with a hardware-copy of the FIB based on the software FIBs (i.e., hardware versions of the software FIBs) copied to each respective PFE 30.

As described herein, the hardware FIBs within the forwarding ASICs are dynamically programmed by control logic on PFEs 30 to include entries that each include a pointer to internal structures within the ASICs, where each of those structures are programmed to store primary/backup data that specifies (1) an identifier for a physical interface port of IFCs 31 of router 20 to be used to reach the primary next hop for the protected LSP and a corresponding MPLS label to be applied to a packet that is forward out that interface port to the primary next hop, and (2) an identifier for a different interface port of IFCs 31 of router 20 used to reach the backup next hop for the backup LSP and a corresponding MPLS label to be applied to the packet in the event it is sent out to the backup next hop for the backup LSP.

In addition, the control logic within each PFE 30 programs each entry in the hardware FIB so as to associate each entry with one of a plurality of selector blocks within the ASIC, where each selector block includes circuitry configured to reflect the state of the physical link and/or interface port to which the primary next hop for the entry is assigned. If the link 15 should fail, the PFE coupled to the IFC 31 servicing the failed link reprograms the selector block of the ASIC (e.g., by rewriting a value within addressable memory in the selector block) to reflect the failure, and the traffic on each of the protected LSPs is automatically redirected to the appropriate backup next hops using the appropriate MPLS label. In this way, the techniques avoid any requirement that PFEs 30 and/or routing engine 26 must having to individually rewrite each next hop in the hardware FIB and/or regenerate the FIB at all.

Figure 3:
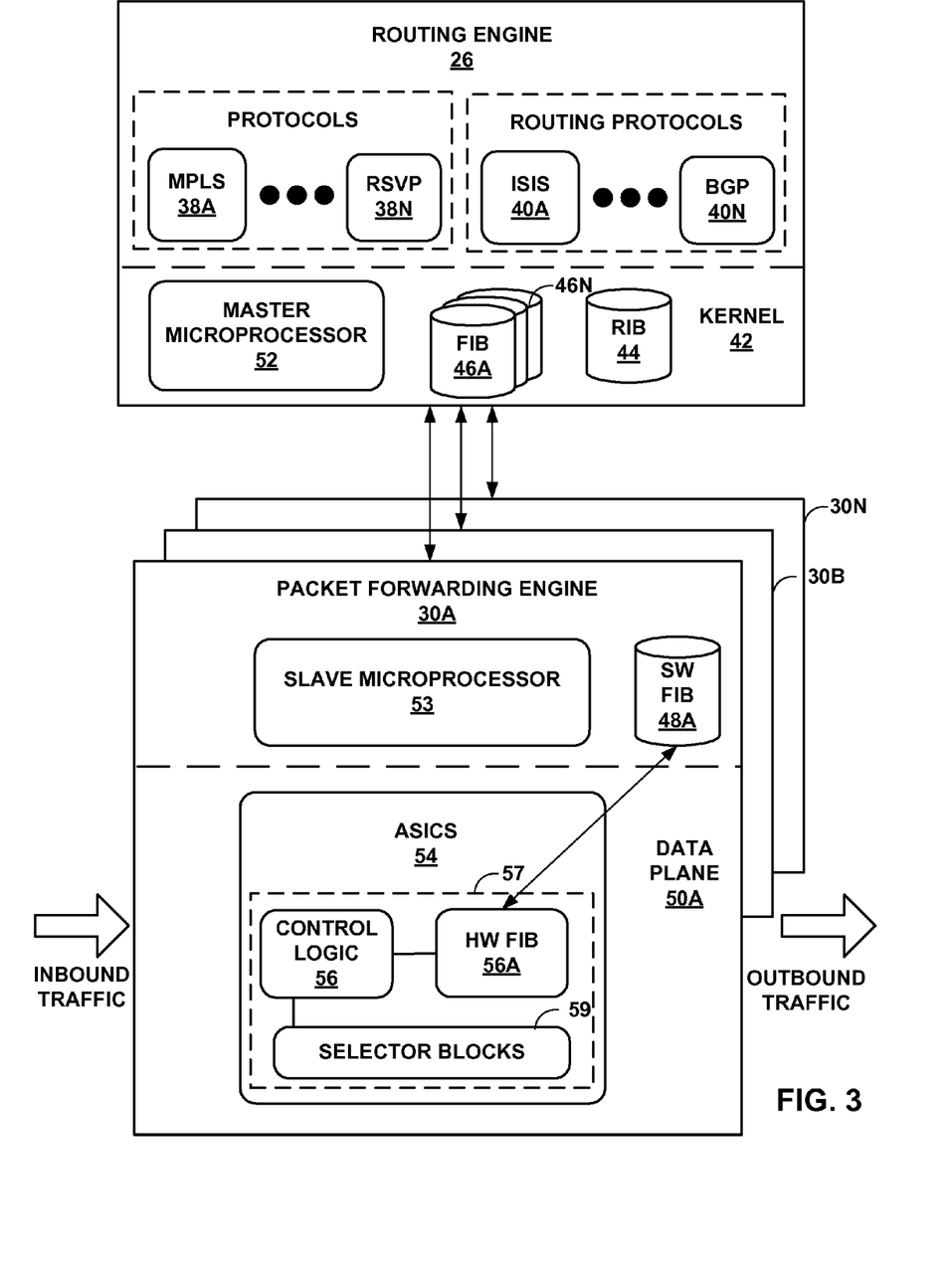
FIG. 3 is a block diagram illustrating a routing engine and a packet-forwarding engine of the router of FIG. 2 in further detail.

FIG. 3 is a block diagram illustrating a routing engine and a packet-forwarding engine of the router 20 of FIG. 2 in further detail. Routing engine 26 includes various protocols 38A-38N, such as MPLS 38A and RSVP 38N. MPLS 38A and RSVP 38N may be used in establishing LSPs within a network that include router 20 as one of the devices along the LSPs. For example, multiple LSPs may be established on each of a plurality of links associated with router 20.

Routing engine 26 also includes high-level, control plane routing protocols 40A-40N ("routing protocols 40"). In the example of FIG. 3, routing protocols 40 include ISIS 40A and BGP 40N. Routing engine 26 may include other protocols and additional routing protocols not shown in FIG. 3. Routing protocols 40 interact with kernel 42 (e.g., by way of API calls) to update routing information base (RIB) 44 based on routing protocol messages received by router 20. In response, master microprocessor 52 of kernel 42 generates forwarding information in the form of FIBs 46A-46N based on the network topology represented in RIB 44, i.e., performs route resolution. For example, master microprocessor 52 determines the physical interface port to be used for the forwarding next hops. Master microprocessor 52 of kernel 42 then programs PFEs 30 to install copies of the FIBs as software FIBs 48A-48N.

In this example, ASICs 54 are microcode-controlled chipsets programmably configured by a slave microprocessor 53 executing on each of PFEs 30A-30N (e.g., PFE 30A). Specifically, one or more of ASICs 54 is controllable by microcode 57 programmed by slave microprocessor 53. The slave microprocessor 53 programs a hardware FIB 56A into internal memory of ASICs 54 within the data plane 50A based on software FIB 48A. When forwarding packets, control logic 56 traverses HW FIB 56A and, upon reaching a FIB entry for the packet (e.g., a leaf node), microcode-implemented control logic 56 automatically selects either a primary forwarding next hop (FNH) or a backup FNH for forwarding the packet on an LSP based on a value output by one of selector blocks 59 associated with the entry (e.g., the value may be represented by a signal). Slave microprocessor 53 monitors the status of links associated with router 20, and programs the selector blocks 59 to reflect any change in the status of a physical link. The interaction between slave microprocessor 53, control logic 56, and HW FIB 56A is described in further detail below with respect to FIG. 4.

After the ASICs 54 are programmed with HW FIBs 56A-56N (HW FIBs 56B-56N not shown), data planes 50A-50N of router 20 may receive inbound traffic including packets having MPLS labels associated with one or more LSPs. For example, router 20 may receive a packet via an interface of PFE 30A. PFE 30A references HW FIB 56A using the MPLS label of the packet as a key to obtain a FNH for the packet, and forwards the packet out the interface port indicated by the FNH, swapping the MPLS label of the packet with a new MPLS label indicated by the FNH. Based on HW FIB 56A and the state of the corresponding selector block, ASICs 54 will automatically forward the packet out the primary interface port or the backup interface port. In this manner, packets are transmitted along the LSP. One example of a router including a packet processing engine having multiple microcode instruction memories is described in U.S. Pat. No. 6,976,154, the entire contents of which are incorporated herein by reference.

Figure 4:
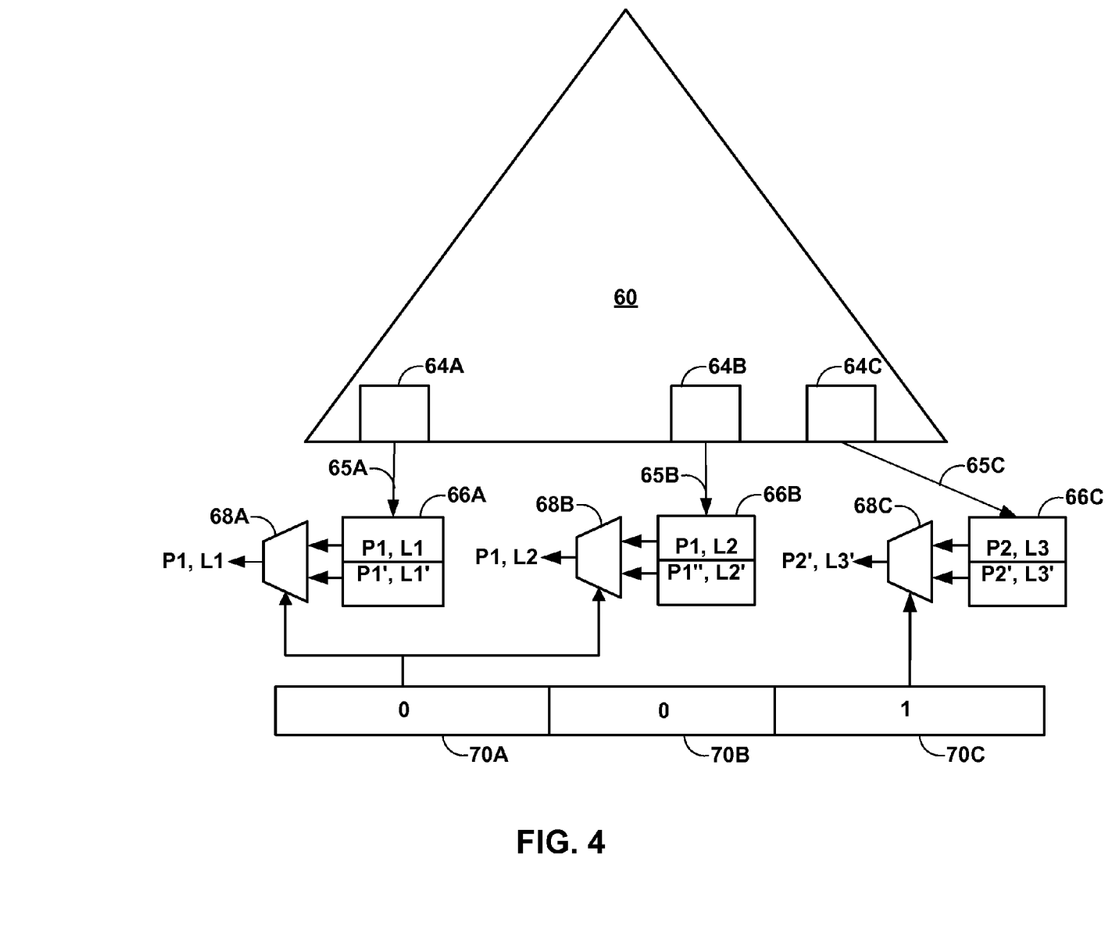
FIG. 4 is a block diagram illustrating a forwarding information base (FIB) maintained by packet-forwarding engines.

FIG. 4 is a block diagram illustrating exemplary structures in which a forwarding information base (FIB) 60 is maintained in hardware of an ASIC by a packet-forwarding engine of a router such as routers 12A-12D of FIG. 1 and router 20 of FIG. 2. In the example of FIG. 4, FIB 60 is arranged as a tree having route resolution leaf nodes 64A-64C that resolve forwarding labels to next hops. Specifically, in the embodiment of FIG. 4, leaf nodes 64A-64C include pointers 65A-65C that reference separate data structures that include forwarding next hop lists 66A-66C ("forwarding next hop lists 66") that list primary/backup next hop pairs. The pointers may comprise indirect next hop data as described in "Network Routing Using Indirect Next Hop Data," U.S. application Ser. No. 10/045,717, filed Oct. 19, 2001, the entire content of which is incorporated herein by reference. The arrangement of FIB 60, or a portion thereof, as a tree is illustrated for exemplary purposes. The principles of invention may readily be applied to other arrangements. FIB 60 may be arranged, for example, as a number of tables, hash tables, link lists, and other data structures.

Upon receiving a packet on an input interface port at one of PFEs 30, control logic 56 reads a block of data, referred to as a key, from the packet. The key may, for example, specify an MPLS label. Control logic 56 resolves the key to one of the leaf nodes of FIB 60, e.g., leaf node 64A, by sequentially testing bits within the key, e.g., bits A, B and C, that represent any bits within the block of data. Based on the value of each bit, control logic 56 follows the links of FIB 60 through the various levels until reaching one of the leaf nodes to identify a forwarding next hop list 66A associated with the key.

Upon identifying a respective leaf node, a pointer 65 directs control logic 56 to one of forwarding next hop lists 66A-66C ("FNH lists 66"), e.g., FNH list 66A. Each of the FHN lists 66 includes two entries, one for the primary FNH that specifies a primary interface port and MPLS label, and one for the backup FNH that specifies a backup interface port and MPLS label. For example, leaf node 64A includes a pointer 65 to FNH list 66A, which specifies a primary forwarding next hop of interface port P1, and specifies that packets sent out the primary FNH should be encapsulated with MPLS label L1. FNH list 66A further specifies a backup FNH of interface port P1', and specifies that packets sent out the backup FNH should be encapsulated with MPLS label L1'.

The leaf nodes 64 may also include pointers (not shown) to one of selector blocks 70A-70C ("selector blocks 70"). Selector blocks 70 are data memory locations that indicate the status of the links associated with protected LSPs associated with network device 20. All FNH lists 66 having the same primary interface port share a corresponding selector block 70 that reflects the status of the link associated with that primary interface port. The selector blocks 70 consist of blocks of memory (e.g., one bit blocks) that indicate whether the link associated with the primary interface port is up or down. Slave microprocessor 53 detects a change in the link status, and updates the appropriate selector block 70 by rewriting the value of the bit stored in the memory space of the selector block 70. For example, a bit value of "0" may indicate that the link associated with the primary interface port is up, while a bit value of "1" may indicate that the link associated with the primary interface port is down.

In the example of FIG. 4, FNH lists 66A and 66B have primary FNHs having a common primary interface port (P1), and different MPLS labels (L1 and L2). This indicates that the primary FNHs of FNH lists 66A and 66B share a common interface port, but correspond to different LSPs using the same interface port and link. Because FNH lists 66A and 66B share a common interface port, FNH lists 66A and 66B also share a common selector block 70A. As shown in FIG. 4, selector block 70A has a value of "0," which indicates that the link associated with the primary interface port P1 of FNH list 66A is active. Therefore, selector block 70A causes multiplexers 68A and 68B to return the primary interface ports and MPLS labels from FNH lists 66A and 66B (i.e., P1, L1 and P1, L2, respectively).

FNH list 66C has a primary FNH with a different interface port (P2), and so FNH list 66C has a different selector block from FNH lists 68A and 68B, i.e., selector block 70C. As shown in FIG. 4, selector block 70C has a value of "1," which indicates that the link associated with the primary interface port P2 of FNH list 66C has failed. Therefore, selector block 70C causes multiplexer multiplexor 68C to return the backup interface port and MPLS label (P2', L3') as the FNH for leaf node 64C. Upon receiving a packet at router 20 to be forwarded, control logic 56 accesses HW FIB 60 and traverses the tree to arrive at a leaf node 64 using the MPLS label of the packet as a key. Control logic 56 reads the FNH selected and output by the corresponding multiplexer multiplexor 68 and directs ASICs 54 to forward received MPLS packets accordingly.

In this manner, if a link status should change (e.g., fail), slave microprocessor 53 need only rewrite the selector block to change the FNH in a single operation from the primary FNH to the backup FNH for all LSPs associated with the failed link. This allows the number of operations necessary to fail over to the backup FNHs when a link fails to be independent of the number of LSPs associated with the failed link. For example, slave microprocessor 53 monitors the status of the link associated with port P1 and detects a change from active to failed. Upon detecting a failure, slave microprocessor 53 rewrites the bit in the memory block of selector block 70A from "0" to "1", which causes multiplexers 68A and 68B to select and output the backup FNH information, i.e., P1', L1' for FNH list 66A and P1", L2' for FNH list 66B. As shown in FIG. 4, FNH lists 66 may share a selector block 70 even if they have different backup FNHs, so long as they have the same primary FNH. For example, the backup FNH may even be on a different PFE or linecard. Providing the primary/backup FNH and selector functionality in PFE hardware avoids the requirement of control plane signaling to entirely rewrite the forwarding next hops in the FIB to reroute traffic through a bypass tunnel.

Figure 5:
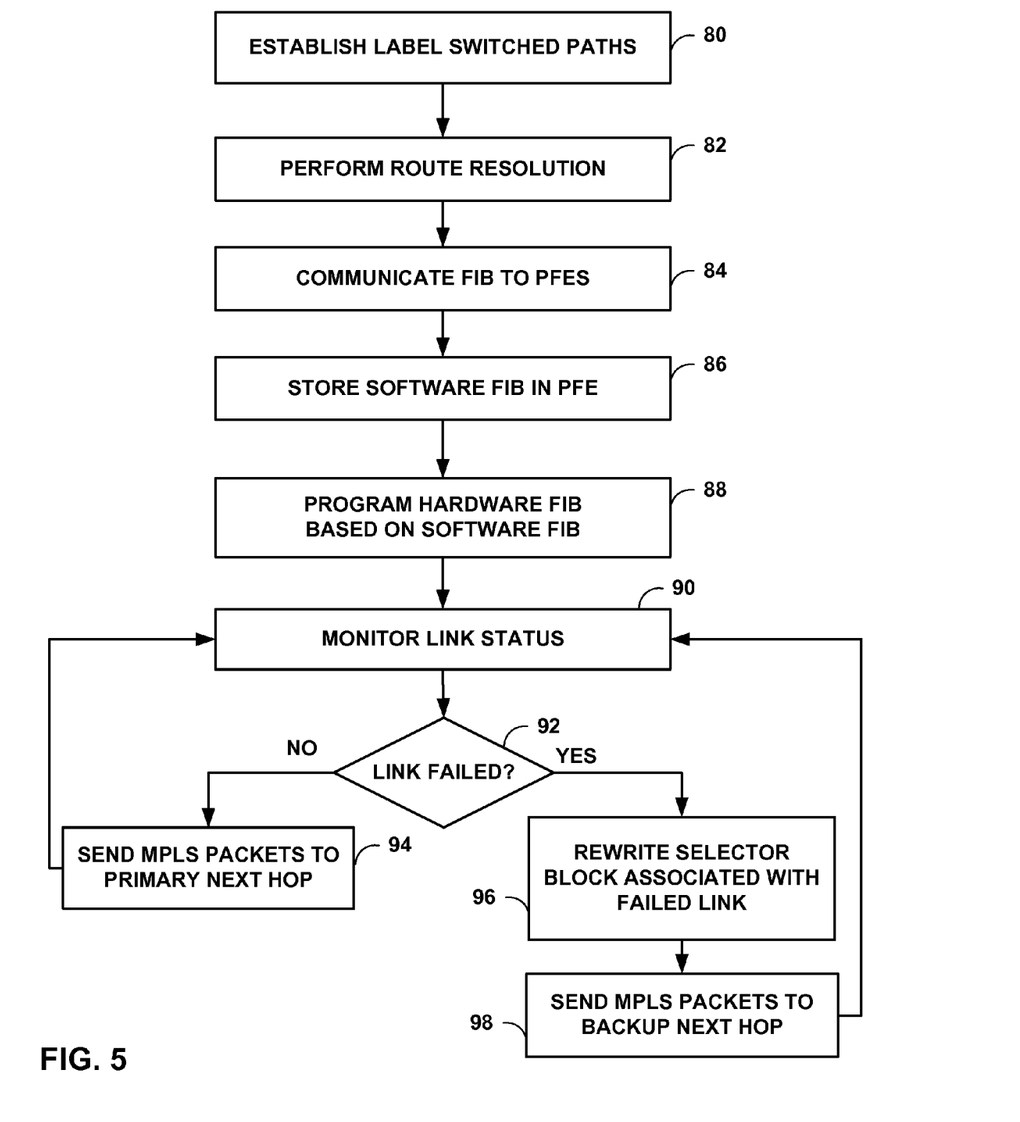
FIG. 5 is a flowchart illustrating example operation of a packet-forwarding engine and a routing engine of a router consistent with the principles of the invention.

FIG. 5 is a flowchart illustrating example operation of a router such as router 12B of FIG. 1 or router 20 of FIG. 2 consistent with the principles of the invention. FIG. 5 will be described with reference to FIGS. 1-4. In operation, router 12B participates in establishing LSPs within network 14 (80). For example, MPLS 38A and RSVP 38N may be used in establishing LSPs within network 14 that include router 12B as one of the devices along the LSPs. Router 12B may have a plurality of LSPs sharing a given interface port of router 12B.

Routing protocols 40 interact with kernel 42 to update routing information base (RIB) 44 based on routing protocol messages received by router 20. In response, master microprocessor 52 of kernel 42 performs route resolution to generate forwarding information in the form of FIBs 46A-46N based on the network topology represented in RIB 44 (82). For example, master microprocessor 52 determines the physical interface port to be used for the forwarding next hops. Master microprocessor 52 of kernel 42 then programs the slave microprocessors 53 of PFEs 30 to install copies of the FIBs as software FIBs 48A-48N (84, 86). A slave microprocessor 53 on each of PFEs 30A-30N (e.g., PFE 30A) programs a hardware FIB 56A of ASICs 54 within the data plane 50A based on software FIB 48A (88). In programming the hardware FIB, the slave microprocessor 53 also programs selector blocks 70 to reflect the status of the links for the interface ports associated with each selector block 70.

During operation of the router, slave microprocessor 53 on each of the PFEs 30 monitors the status of links associated with each interface port of its PFE 30 (90). When a link is still active (NO branch of 92), the selector block 70 for that link remains set at "0," which causes the primary forwarding next hops to be selected for all FNH lists associated with that selector block when the PFE receives MPLS packets and control logic 56 traverses the tree to reach an end node 64. In this case, MPLS packets are forwarded to the interface ports that correspond with the primary next hops (94). When slave microprocessor 53 detects that a link associated with one of the interface ports has failed (YES branch of 92), slave microprocessor 53 rewrites a selector block 70 associated with the interface port to reflect a value of "1," which indicates that the link is down (96). This automatically causes subsequent MPLS packets received by the PFEs to be directed to the backup forwarding next hops for all LSPs associated with that link and interface port (98). Thus, only a single operation is needed in order to redirect all LSPs on a failed link to a backup link. Moreover, control plane signaling to entirely rewrite hardware FIB entries is not needed for this operation. This allows for a faster reroute and more scalability. When the failed link later becomes operational, control logic 56 may again rewrite the corresponding selector block with "0" to reflect the changed status.

Various embodiments of the invention have been described. These and other embodiments are within the scope of the following claims.

The invention claimed is:

1. A router comprising:
a routing protocol configured to maintain routing information in accordance with a topology of a network;
a first interface port configured to engage a first physical link;
a packet-forwarding engine (PFE) configured to output multi-protocol Label Switching (MPLS) packets associated with a plurality of label switched paths (LSPs) onto the first physical link using the first interface port; and
a packet-forwarding integrated circuit (IC) of the PFE comprising a control logic module and selector block configured with a value indicating a state of the first physical link,
wherein the packet-forwarding IC is programmed to internally store a hardware version of a forwarding information base (FIB) in accordance with the routing information, the hardware version of the FIB including a plurality of entries addressable by the packet-forwarding IC, the entries identifying pairs of primary forwarding next hops and backup forwarding next hops for the LSPs,
wherein the selector block of the packet-forwarding IC is configured to output one of the primary forwarding next hop and the backup forwarding next hop of the entries for forwarding the MPLS packets based on the value indicating the state of the first physical link in response to the control logic module addressing one of the entries of the FIB for the LSPs, and
wherein the PFE forwards the MPLS packets to the one of the primary forwarding next hop and the backup forwarding next hop output by the selector block.

2. The router of claim 1, wherein when the selector block produces a value indicating the state of the first physical link is active, the selector block is configured to output the primary forwarding next hop of an entry of the hardware version of the FIB for forwarding the MPLS packets, wherein the primary forwarding next hop is associated with the first interface port.

3. The router of claim 1, wherein when the selector block produces a value indicating the state of the first physical link is failed, the selector block is configured to output the backup forwarding next hop of an entry of the hardware version of the FIB for forwarding the MPLS packets, wherein the backup forwarding next hop is associated with a second interface port configured to engage a second physical link.

4. The router of claim 1,
wherein the selector block is electrically coupled to a memory that stores an indication of the state of the link, further comprising a slave microprocessor of the PFE configured to write the memory of the selector block to reflect a detected state of the first physical link, and configured to rewrite the memory upon detecting a change to the state of the first physical link to reflect the changed state.

5. The router of claim 4, wherein upon the slave microprocessor rewriting the memory, the section circuitry is configured to switch from outputting the primary forwarding next hops to outputting the backup forwarding next hops for those entries in the hardware version of the FIB that correspond to the selector block, without requiring the forwarding next hops in the hardware version of the FIB to be individually rewritten.

6. The router of claim 1, wherein a number of operations required to redirect packets from a primary forwarding next hop associated with the first physical link to a backup forwarding next hop associated with a second link is independent of the number of the plurality of LSPs associated with the first physical link.

7. The router of claim 1, further comprising one or more line cards comprising the one or PFE, the first interface port, the hardware version of the FIB, and the packet-forwarding IC.

8. The router of claim 1, further comprising:
a master microprocessor configured to maintain forwarding information that associates forwarding labels with forwarding next hops in accordance with the routing information; and
a slave microprocessor configured to maintain the hardware version of the FIB in accordance with the forwarding information maintained by the master microprocessor.

9. The router of claim 8, wherein the forwarding labels comprise Multiprotocol Label Switching (MPLS) labels associated with the plurality of LSPs.

10. The router of claim 8, wherein the slave microprocessor programs the packet-forwarding IC with the hardware version of the FIB based on the forwarding information maintained in accordance with the routing information.

11. The router of claim 1, wherein the value produced by the selector block indicates one or more of a physical state of the first physical link and a logical state of the first physical link.

12. A method comprising:
maintaining routing information in accordance with a topology of a network with a routing protocol of a router;
with a packet-forwarding engine (PFE) of the router, outputting multi-protocol Label Switching (MPLS) packets associated with a plurality of label switched paths (LSPs) onto a first physical link using a first interface port, wherein the first interface port is configured to engage the first physical link;
programming a packet-forwarding integrated circuit (IC) of the PFE to internally store a hardware version of a forwarding information base (FIB) in accordance with the routing information, the hardware version of the FIB including a plurality of entries addressable by the packet-forwarding IC, the entries identifying pairs of primary forwarding next hops and backup forwarding next hops for the LSPs, wherein the packet-forwarding IC comprises a control logic module and internal selector block configured to produce a value indicating a state of the first physical link,
wherein the selector block of the packet-forwarding IC is configured to output one of the primary forwarding next hop and the backup forwarding next hop of the entries for forwarding the MPLS packets based on the value indicating the state of the first physical link in response to the packet-processing engine addressing one of the entries of the FIB for the LSPs; and forwarding packets with the PFE to the one of the primary forwarding next hop and the backup forwarding next hop that is output by the selector block.

13. The method of claim 12, when the selector block produces a value indicating the state of the first physical link is active, outputting with the selector block the primary forwarding next hop of an entry of the hardware version of the FIB for forwarding the MPLS packets, wherein the primary forwarding next hop is associated with the first interface port.

14. The method of claim 12, when the selector block produces a value indicating the state of the first physical link is failed, outputting with the selector block the backup forwarding next hop of an entry of the hardware version of the FIB for forwarding the MPLS packets, wherein the backup forwarding next hop is associated with a second interface port configured to engage a second physical link.

15. The method of claim 12, further comprising:
detecting a failure of the first physical link;
rewriting the selector block to indicate the failure of the first physical link; and
forwarding packets to the backup forwarding next hops of entries associated with the selector block based on the selector block's indication of the failure of the first physical link.

16. The method of claim 12, further comprising the selector block switching from outputting the primary forwarding next hops to outputting the backup forwarding next hops for those entries in the hardware version of the FIB that correspond to the selector block, without requiring the forwarding next hops in the hardware version of the FIB to be individually rewritten.

17. The method of claim 12, wherein the value produced by the selector block indicates one or more of a physical state of the first physical link and a logical state of the first physical link.

18. A non-transitory computer-readable medium comprising instructions for causing a programmable processor to:
with a packet-forwarding engine (PFE) of the router, output multi-protocol Label Switching (MPLS) packets associated with a plurality of label switched paths (LSPs) onto a first physical link using a first interface port, wherein the first interface port is configured to engage the first physical link;
program a packet-forwarding integrated circuit (IC) of the PFE to internally store a hardware version of a forwarding information base (FIB) in accordance with routing information maintained in accordance with a topology of a network, the hardware version of the FIB including a plurality of entries addressable by the packet-forwarding IC, the entries identifying pairs of primary forwarding next hops and backup forwarding next hops for the LSPs, wherein the packet-forwarding IC comprises a control logic module and internal selector block configured to produce a value indicating a state of the first physical link,
wherein the selector block of the packet-forwarding IC is configured to output one of the primary forwarding next hop and the backup forwarding next hop of the entries for forwarding the MPLS packets based on the value indicating the state of the first physical link in response to the packet-processing engine addressing one of the entries of the FIB for the LSPs; and
forward packets with the PFE to the one of the primary forwarding next hop and the backup forwarding next hop that is output by the selector block.

* * * * *